(No Model.) 2 Sheets—Sheet 1.
V. C. BAILEY.
BAND CUTTER AND FEEDER.
No. 412,064. Patented Oct. 1, 1889.
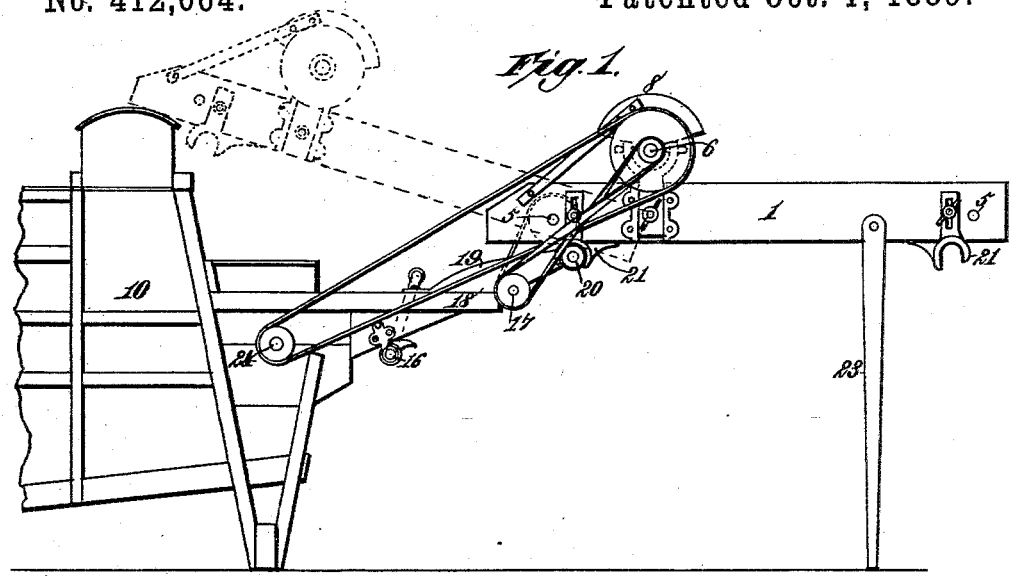
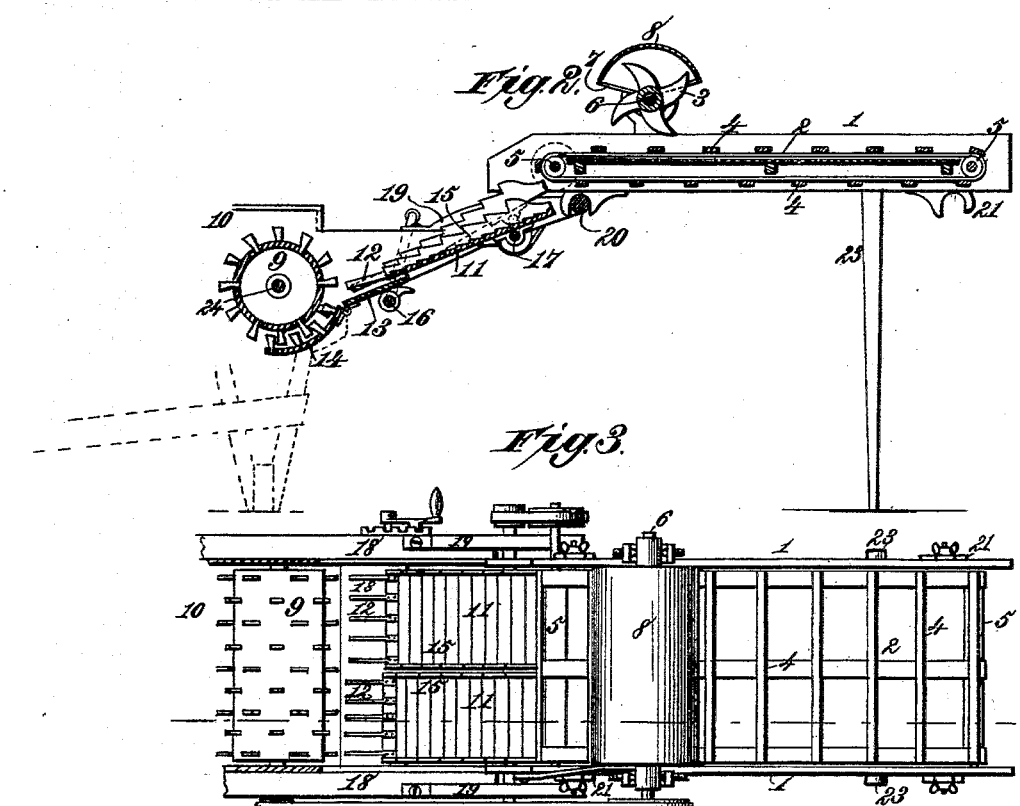
Witnesses.
Robert Everett,
Percy B. Hills.
Inventor.
Victor C. Bailey.
By James L. Norris.
Atty.

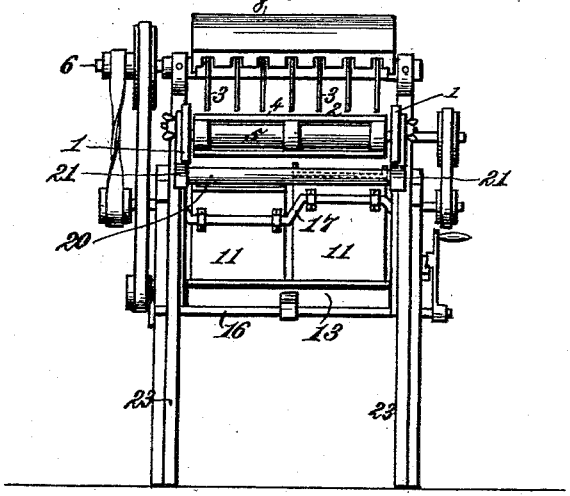

UNITED STATES PATENT OFFICE.

VICTOR C. BAILEY, OF BATTLE CREEK, MICHIGAN, ASSIGNOR TO THE ADVANCE THRESHER COMPANY, OF SAME PLACE.

BAND-CUTTER AND FEEDER.

SPECIFICATION forming part of Letters Patent No. 412,064, dated October 1, 1889.

Application filed January 16, 1889. Serial No. 296,507. (No model.)

*To all whom it may concern:*

Be it known that I, VICTOR C. BAILEY, a citizen of the United States, residing at Battle Creek, in the county of Calhoun and State of Michigan, have invented new and useful Improvements in Band-Cutters and Feeders, of which the following is a specification.

This invention has for its object to provide a novel grain band-cutter and feeder for grain-separators, to provide novel means for severing the bands and spreading the grain in its passage to the separator, to provide novel means for controlling the delivery of the grain and preventing the cylinder of the separator from being choked, and to provide for operating on all the varying conditions of grain likely to be met with.

The objects of my invention I accomplish by the features of construction and combinations of devices hereinafter described and claimed, reference being made to the accompanying drawings, in which—

Figure 1 is a side elevation of the band-cutter and feeder applied to a grain-separator, with the main portion of the latter broken away and showing the feeder-frame by dotted lines as adjusted upon the separator-frame for transportation; Fig. 2, a vertical sectional view of the band-cutter and feeder, showing also the concave and cylinder of a grain-separator; Fig. 3, a top plan view of the same; Fig. 4, a detail end elevation of the same; Fig. 5, a detail side view of the supporting-bracket for the crank-shaft and roller-shaft; Fig. 6, a detail top plan view of the crank-shaft and its supporting-bracket; Fig. 7, a detail plan view looking at the under side of the band-cutters and their hood or shield, and Fig. 8 a detail cross-sectional view of one of the fingers or rods on the grain-delivery pans.

In order to enable those skilled in the art to make and use my invention, I will now describe the same in detail, referring to the drawings, wherein The numeral 1 indicates the frame of the band-cutter and feeder, and 2 the grain-table, which I have shown as an endless apron having transverse strips 4 and arranged on rollers 5, journaled in the side strips of the frame. A cutter-shaft 6 is journaled in suitable boxes or bearings above the frame 1, and is provided with a series of cutters 3, that are preferably curved or sickle-shaped and radiate from the shaft and move in slots 7 of an arched hood or shield 8, fixed in a stationary position over the cutter-shaft, such hood or shield having a closed top extremity that covers the cutters to protect the operator against injury, while at the same time the cutters by passing through the slots in the bottom wall of the hood are prevented from carrying straw and winding the latter around the cutter-shaft. The arrangement of the cutters is such that while they are covered and guarded on top they sever the band of the grain and spread the bundle on the table, so that the grain is conveyed evenly to the cylinder 9 of a grain-separator 10. In practice the hood may be supported either by the cutter-shaft or by the boxes or bearings thereof.

The grain delivery or feed pans 11 (one or more) are located between the inner end of the table 1, and the thrashing-cylinder, and each carries a series of rigidly-attached fingers or rods 12, extending longitudinally from the pans toward the cylinder, and the pans rest on a vertically-adjustable feed-board 13, hinged or otherwise movably secured to the concave 14 or other fixed part of the grain-separator. The pans are furnished with teeth or corrugations 15, that feed or move the grain down upon the series of fingers or rods, and the latter support and conduct the grain evenly to the cylinder.

The straw supporting and conducting fingers or rods 12 are preferably provided with a knife-edge, as shown, for example, by the detail view, Fig. 8, as such construction I find more satisfactory for the varying conditions of straw, especially for further tearing the straw apart after the band has been cut and the straw spread by the cutters over the grain-table.

It is advisable to employ two grain feed or delivery pans, in that one balances the other on the crank-shaft; but as regards feeding the cylinder a single pan may be used; but in that event some means of balancing it should be provided in order to avoid a jerking motion.

For the purpose of controlling the flow of the grain to the cylinder according to its varying nature or condition, it is important to adjust and hold the fingers or rods and pans at different heights or levels with respect to the axis of the cylinder in such manner that choking or slugging the cylinder is prevented by properly controlling the flow of grain thereto, this being effected by more or less raising the inner extremities of the fingers or rods and delivery-pan toward a horizontal line taken centrally through the cylinder.

To raise and lower the fingers and pans, I raise and lower the feed-board 13 on its hinged or other movable support, and to move the feed-board and hold or lock it in the position to which adjusted I may employ any mechanical contrivance suitable for the conditions required. I show as one adjusting and holding means a rotary shaft 16, journaled under the feed-board and having a cam projection, which lifts the feed-board when the shaft is rotated. The feed-board, pans, and fingers may descend by their own weight, or otherwise, when the cam projection is brought to the position shown by full lines, Fig. 2.

The delivery-pans are supported at or near their upper or outer ends by a crank-shaft 17, on the cranks of which shaft the pans can swing for moving their inner ends upwardly and downwardly when the feed-board is adjusted, as before explained. The crank-shaft serves to reciprocate the pans and to rapidly vibrate or raise and lower their upper or outer ends, and in such movements the shaking pans ride on the feed-board, while the latter prevents escape of grain between the pans and concave, for which purpose the feed-board is an imperforate structure.

The grain-separator frame 10 is furnished with side arms 18, extending horizontally and carrying a bracket or casting 19, which supports at its outer end a transverse roller-shaft 20, that sustains the inner end of the feeder-frame 1. This frame is furnished at each end with pendent forked arms 21, which can embrace the roller-shaft 20, and the outer end portion of the frame is provided with a pivoted leg 23, by adjusting which back and forth the outer end of the frame can be more or less raised without materially changing the relative positions of the inner end of the table or apron and the upper or outer ends of the delivery-pans. The forked arms 21 at the inner end of the feeder-frame 1 can be lifted from the roller-shaft 20 and the frame be moved up to rest on the grain-separator until the forked arms 21 at the outer end of the feeder-frame rest on the roller, as represented by dotted lines in Fig. 1. This is a convenient and desirable means of transporting the feeder with the separator. The roller-shaft 20 acts as a pivot or bearing on which the feeder-frame 1 can turn when the hinged or pivoted leg 23 is adjusted to vary the position of the table or apron.

I have shown the cutter-shaft belted to the cylinder-shaft 24 and revolved thereby; but I do not confine myself to a revolving cutter-shaft, nor to any specific means for transmitting motion thereto. The crank-shaft is belted to the cutter-shaft and to one of the supporting-rollers of the endless apron in such manner that where a revolving cutter-shaft is employed it transmits the required motion to the crank-shaft and apron.

What I claim is—

1. The combination of the movable grain-table, the rotating band-cutters, the vibrating grain-delivery pan at the inner end of the grain-table, the fingers or rods extending in the direction of their length from the grain-pan toward the cylinder of the grain-separator and serving to support and carry the grain after it leaves the grain-delivery pan and to conduct such grain to the cylinder, and devices under the fingers or rods for supporting and raising the latter to different heights, substantially as described.

2. The combination of the movable grain-table, the rotating band-cutters, the vibrating grain-delivery pan at the inner end of the grain-table, the fingers or rods extending in the direction of their length from the grain-pan toward the cylinder of the grain-separator and serving to support and carry the grain after it leaves the grain-delivery pan and to conduct such grain to the cylinder, a hinged feed-board located under and supporting the fingers or rods between the grain-delivery pan and the cylinder, and devices beneath the feed-board for lifting the latter and correspondingly raising the fingers or rods, substantially as described.

3. The combination of the movable grain-table, the vibrating grain-delivery pan provided at its discharge end with fingers or rods which extend in the direction of their length toward the cylinder of the grain-separator and serve to support the grain leaving the pan, and devices below the fingers or rods for raising the latter with the grain-delivery pan, substantially as described.

4. The combination of the movable grain-table, the vibrating grain-delivery pan located at the inner end of the table and provided with attached fingers or rods which extend lengthwise toward the cylinder of the grain-separator and serve to support and carry the grain which leaves the grain-pan, a vertically-movable feed-board located under and supporting the fingers or rods and grain-pan, and a cam-shaft arranged under the feed-board to raise the latter and correspondingly raise the fingers or rods and grain-pan, substantially as described.

5. The combination, with a grain-thrasher and a roller supported at the feed end thereof, of a band-cutter and feeder-frame having a pivoted leg and provided with forked arms at its inner and outer ends, adapted to rest on the roller to support the band-cutter and feeder frame on the thrasher either in operative position for feeding or for transportation, substantially as described.

6. The combination, with a grain-thrasher, of the side arms thereof, the bracket on the side arms, the transverse roller carried by the bracket, and the band-cutter and feeder frame having an adjustable leg and provided with pendent forked arms at both its inner and outer ends, adapted to embrace and rest upon the roller, substantially as described.

In testimony whereof I affix my signature in presence of two witnesses.

VICTOR C. BAILEY.

Witnesses:
   W. A. DAVIS,
   A. G. HIGHAM.